United States Patent [19]

Akhtarekhavari

[11] Patent Number: 4,474,209

[45] Date of Patent: Oct. 2, 1984

[54] SOLAR HEATING CHECK VALVE AND FLOW INDICATOR

[76] Inventor: Farid Akhtarekhavari, 8621 SW. 179th St., Miami, Fla. 33157

[21] Appl. No.: 442,629

[22] Filed: Nov. 18, 1982

[51] Int. Cl.³ .............................................. F16K 15/02
[52] U.S. Cl. ................... 137/559; 137/528; 116/274; 116/276; 126/419
[58] Field of Search .................. 73/276, 861.83; 116/273, 274; 126/432, 437; 137/559, 552, 551; 251/324, 325, 333

[56] References Cited

U.S. PATENT DOCUMENTS

| | | | |
|---|---|---|---|
| 442,465 | 12/1890 | Stamer | 251/333 X |
| 1,370,483 | 3/1921 | Powell | 251/324 X |
| 1,385,973 | 7/1921 | Brown | 116/274 |
| 1,897,492 | 2/1933 | Ledoux | 137/559 |
| 2,599,201 | 6/1952 | Rubenstein et al. | 116/274 |
| 4,210,125 | 7/1980 | Fender | 126/437 |
| 4,329,979 | 5/1982 | Frank | 126/437 X |

FOREIGN PATENT DOCUMENTS 655154  4/1929  France .................. 73/861.83

Primary Examiner—Samuel Scott
Assistant Examiner—Allen J. Flanigan
Attorney, Agent, or Firm—Jack E. Dominik

[57] ABSTRACT

Disclosed is a pair or check valves for a home solar heating apparatus, one check valve for the solar collector supply line and one for the return line. The check valves have a transparent portion and an impeller which rotates during water flow and is located in the transparent portion, providing a visual check on water flow. Further, the impeller in the collector supply line acts as a check valve element which is gravity closed due to the impeller's greater-than-water density. Analogously, the impeller in the solar collector return line acts as a check valve due to its less-than-water density, these check valves operating to permit the usual direction of flow powered by a circulating pump but impeding the opposite direction of flow powered by thermosyphoning.

2 Claims, 4 Drawing Figures

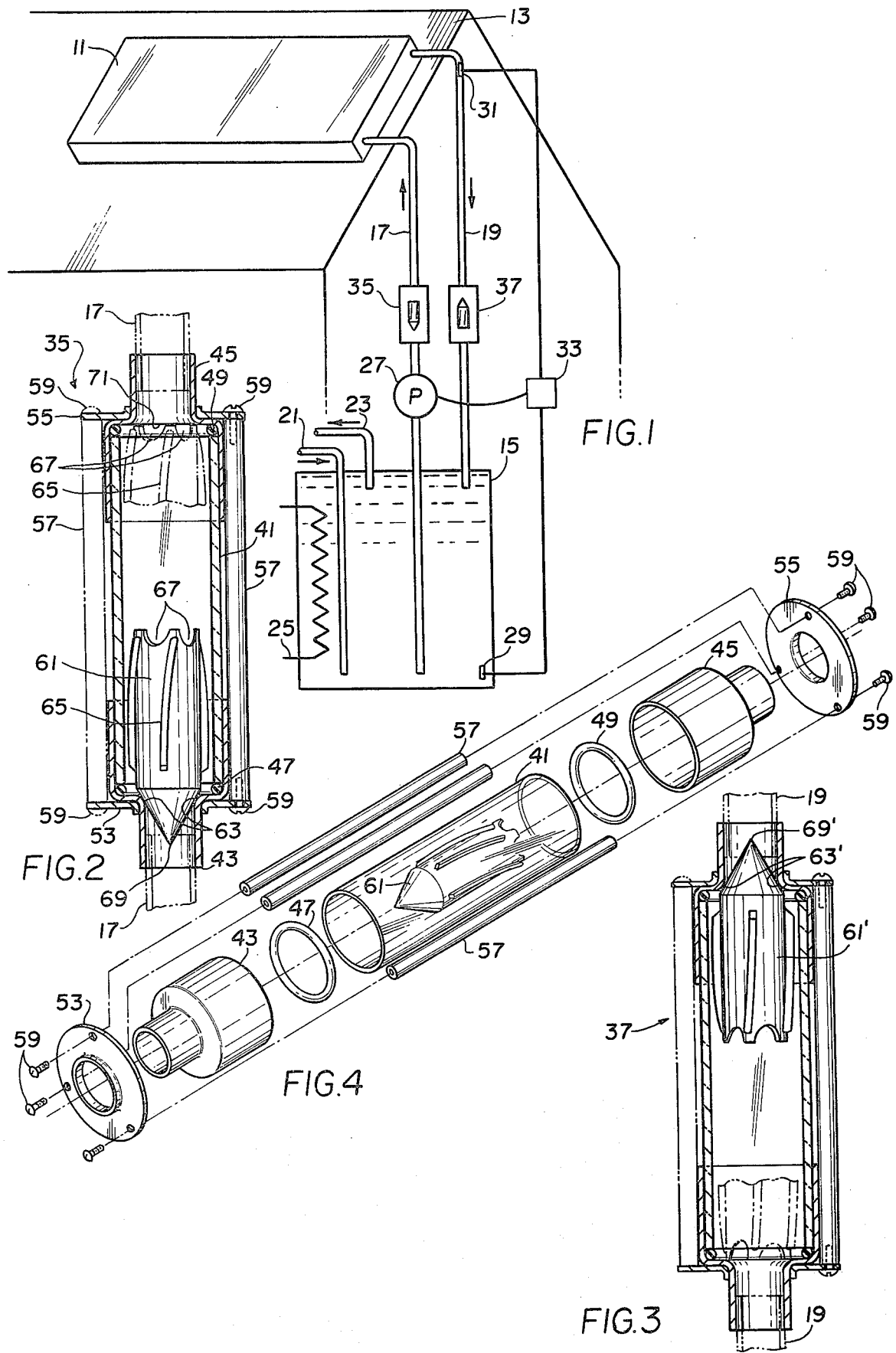

SOLAR HEATING CHECK VALVE AND FLOW INDICATOR

BACKGROUND OF THE INVENTION

1. Field of the Invention

The present invention relates to valves for a home solar heating apparatus, and in particular to valves both inhibiting thermosyphoning and indicating flow.

2. Description of the Prior Art

A solar heating apparatus for home use is well known and generally consists of a solar collector mounted on the roof, pipes connecting the solar collector with the hot water heater, and a circulating pump which circulates the water from the hot water heater through the solar collector and back. Usually, a thermostatic control for the circulating pump is provided so that when the temperature in the solar collector output drops below that of the hot water heater, the circulating pump is turned off because the solar collector has become, in effect, a radiator transferring heat from the water heater back to the atmosphere.

A problem with such a home solar heating apparatus is thermosyphoning which is the circulation caused by the density difference between hot and cold water and which may occur when the circulating pump is turned off. In short, if the water in the solar collector cools, such as at night, and the circulating pump is off, then the water at the collector supply (the lower inlet) is cooler and denser than the water at the collector return (the higher outlet). This difference in density forces the water in the supply line down into the water heater and the water in the return line up out of the heater and into the solar collector. Once in the solar collector, the warmer lighter water cools and becomes cooler denser water and flows down to the collector supply line, continuing the circulation. In order to prevent this thermosyphoning, electrical valves coupled with the circulating pump have been used, but such valves are expensive and subject to electrical component failure.

Another problem found in the usual home solar heating apparatus is the accumulation of air bubbles. The air bubbles will cause turbulence and lack of good thermal contact so that heat transfer efficiencies will drop at the solar collector and also will result in cavitation in the circulating pump and a consequent drop in the flow rate when the pump is on. Detection of such inefficiencies is difficult because the water flow is not visually observed, and when the circulating pump is turned on the homeowner presumes that the water is efficiently flowing to the solar collector to be efficiently heated.

SUMMARY OF THE INVENTION

The invention provides a pair of check valves for a home solar heating apparatus, one check valve for the solar collector supply line and one for the return line. The check valves have a transparent portion and a impeller which rotates during water flow and is located in the transparent portion, providing a visual check on water flow. Further, the impeller in the collector supply line acts as a check valve element which is gravity closed due to the impeller's greater-than-water density. Analogously, the impeller in the solar collector return line acts as a check valve due to its less-than-water density, these check valves operating to permit the usual direction of flow powered by a circulating pump but impeding the opposite direction of flow powered by thermosyphoning.

Thus the thermosyphoning problem and the flow indication problem of the prior art are simultaneously solved by the present invention.

BRIEF DESCRIPTION OF THE DRAWINGS

FIG. 1 shows a diagrammatic view of a solar heating apparatus and indicates the location of the inventive check valves;

FIGS. 2 and 3 are cross-sectional views of preferred embodiments of the inventive check valves; and FIG. 4 is an exploded view of the preferred embodiments of FIGS. 2 and 3.

DESCRIPTION OF THE PREFERRED EMBODIMENT

FIG. 1 shows, in a diagrammatic way, the typical installation of a solar heating apparatus for residential use. Items such as freeze sensor, drain, vacuum breaker, and automatic air vent are not shown because they do not aid understanding of the invention. Solar collector 11 is mounted on roof 13 and connected to hot water heater 15 by collector supply line 17 and collector return line 19. Hot water heater 15 also has an input from the municipal water supply 21 and an outlet 23 to the hot water taps of the residence. Hot water heaters are generally either gas operated or electrically operated, hot water heater 15 being shown as an electrical heater with heating coil 25.

Solar heating operates in conjunction with heating by electrical coil 25 in hot water heater 15 as follows. Circulation pump 27 draws water from the bottom of hot water heater 15 (the coolest water has the greatest density and will be found at the bottom of hot water heater 15) and forces it up into solar collector 11. Solar collector 11 has been heated by the sun and this heat is transferred to the water being pumped in by circulating pump 27. The water heated in solar collector 11 exits at return line 19 and returns to hot water heater 15. Temperature sensors 29 (in the bottom of hot water heater 15) and 31 (near the water exit of solar collector 11) control the pumping of water through the solar collector 11 by providing that circulating pump 27 is turned on if sensor 31 indicates a higher temperature at the exit of solar collector 11 than sensor 29 reads at the bottom of hot water heater 15. Conversely, if sensor 31 reads a lower temperature than sensor 29, then control unit 33 turns off circulating pump 27.

The operation of the preferred embodiment check valves 35 and 37 may now be explained. Turning to FIG. 2, check valve 35 has glass cylinder 41 mounted in end pieces 43 and 45 with O-rings 47 and 49. End pieces 43 and 45 are made of copper so that check valve 35 may be inserted into collector supply line 17 (which typically is also copper) by merely cutting a section out of line 17 and soldering. O-rings 47 and 49 are preferably of type BUNA-Nas manufactured by Parco, Inc. End pieces 43 and 45 are held together pressing on O-rings 47 and 49 by end plates 53 and 55 which, in turn, are held together by three shafts 57 and screws 59.

Impeller 61 is located within glass cylinder 41 and free to move between the low point shown in solid lines in FIG. 2 and the high point shown in dotted lines.

When circulating pump 27 is turned on and water is being pumped from hot water heater 15 up to solar collector 11, the flow is from the bottom to the top in FIG. 2. The flow of water pushes impeller 61 up from seat 63 and flows past impeller 61 and out the top in FIG. 2. This flow past impeller 61 exerts a rotational force on four equispaced vanes 65 which are each angled about 10° from parallel. This rotation of impeller 61 during water flow is visible through glass cylinder 41 and provides a visual indication of flow. Under extreme flow rates impeller 61 will be forced by friction to the top dotted line position shown in FIG. 2. In such a case, impeller 61 does not cut off the water flow because semicircular gaps 67 have been provided at the top end of impeller 61. Thus in contrast to impeller end 69 which engages seat 63 to form a seal when impeller 69 is at the bottom most position in FIG. 2, impeller 61 only engages seat 71 of end piece 45 at four points, each of which is at an end of a vane 65; between these points are gaps 67.

When circulating pump 27 is turned off, impeller 61 sinks downward in FIG. 2 because impeller 61 is made of Laxan plastic which has a specific gravity greater than one, and end 69 engages seat 63 so as to prevent any flow of water from top to bottom in FIG. 2. Thermosyphoning in the solar heating apparatus of FIG. 1 could occur if a flow from top to bottom in FIG. 2 were permissible.

FIG. 3 shows check valve 37 which is essentially identical to check valve 35 except for the orientation and material that impeller 61' is made of. Because the flow during operation of circulating pump 27 is from top to bottom in FIG. 3 (i.e., the opposite from FIG. 2), impeller 61 is oriented to permit flow from top to bottom but to check flow from bottom to top. The operation of impeller 61' is analogous to that of impeller 61, except that impeller 61' is made of polypropylene plastic which has a specific gravity less than that of water, so when circulating pump 27 is turned off, impeller 61' floats upwards in FIG. 3 to have end 69' engage seat 63' and prevent flow from bottom to top in FIG. 3. The direction of thermosyphoning, if it were to occur, would be from bottom to top in FIG. 3.

Convenient dimensions for check valves 35 (and 37) are as follows:

| Item | Measurement | |
| --- | --- | --- |
| Cylinder 41 | Length | 4 inches |
| | O.D. | 1¼ |
| | I.D. | 1 1/16 |
| Shaft 57 | Length | 4⅜ |
| O ring 49 | O.D. | 1¼ |
| | I.D. | 1 |
| End pieces | Large end I.D. | 1 9/21 |
| 43 and 45 | small end I.D. | ⅝ |
| | Large end length | 1⅛ |
| | Small end length | ⅝ |
| Impeller 61 | Overall length | 2¼ |
| | Vane 65 length | 1 5/16 |
| | Cylinder diameter | ⅞ |
| | Vane height | ⅛ |
| | Vane thickness | 1/16 |
| | Gap 67 radius | 3/16 |

These dimensions provide check valves which may easily be installed in home solar heating apparatus which typically employs copper pipe of ½ inch nominal diameter.

Although particular embodiments of the invention have been shown and described in full here, there is no intention to thereby limit the invention to the details of such embodiments. On the contrary, the intention is to cover all modifications, alternatives, embodiments, usages and equivalents of the present invention, as fall within the spirit and scope of the specification and appended claims.

I claim:

1. A check valve for a residential solar heating system including a solar collector, a circulating pump, a hot water heater, a collector supply line, and a collector return line, comprising:
   (a) a generally cylindrical, transparent body,
   (b) means for attaching said body to one of said lines so that water flowing in said line passes through said body and said body is oriented with its cylindrical axis generally vertical,
   (c) a free floating impeller located within said body and constrained by said body to rotate therein, said impeller characterized by
      (i) a generally cylindrical portion with diameter somewhat less than the inside diameter of said body,
      (ii) a conical bottom portion,
      (iii) a gapped upper portion,
      (iv) vanes on the exterior of the cylindrical portion so that water flowing through said body from bottom to top flows over said conical portion and along said vaned cylindrical portion causing said impeller to rotate,
      (v) a density slightly greater than water's so that said impeller:
         (A) is gravitationally forced towards the bottom of said body if no water is flowing through said body from bottom to top, and
         (B) is frictionally lifted away from the bottom of said body if water is flowing through said body from bottom to top,
   (d) a circular outlet at the bottom of said body of diameter slightly less than the diameter of said cylindrical portion and for sealingly engaging said conical portion when no water is flowing through said body from bottom to top and thereby preventing water flowing through said body from top to bottom.

2. A check valve for a residential solar heating system including a solar collector, a circulating pump, a hot water heater, a collector supply line, and a collector return line, comprising:
   (a) a generally cylindrical, transparent body,
   (b) means for attaching said body to one of said lines so that water flowing in said line passes through said body and said body is oriented with its cylindrical axis generally vertical,
   (c) a free floating impeller located within said body and constrained by said body to rotate therein, said impeller characterized by
      (i) a generally cylindrical portion with diameter somewhat less than the inside diameter of said body,
      (ii) a conical upper portion,
      (iii) a gapped bottom portion,
      (iv) vanes on the exterior of the cylindrical portion so that water flowing through said body from top to bottom flows over said conical portion and along said vaned cylindrical portion causing said impeller to rotate,
      (v) a density slightly less than water's so that said impeller:
         (A) is buoyantly forced towards the top of said body if no water is flowing through said body from top to bottom, and (B) is frictionally pulled down from the top of said body if water is flowing through said body from top to bottom, (d) a circular outlet at the top of said body of diameter slightly less than the diameter of said cylindrical portion and for sealingly engaging said conical portion when no water is flowing through said body from bottom to top.

* * * * *